US012789636B2

(12) United States Patent
Ho

(10) Patent No.: US 12,789,636 B2
(45) Date of Patent: Nov. 10, 2026

(54) DRIVING PATTERN REGENERATIVE BRAKING METHOD OF VEHICLE

(71) Applicant: Hyundai Kefico Corporation, Gunpo (KR)

(72) Inventor: Jun Young Ho, Seoul (KR)

(73) Assignee: Hyundai Kefico Corporation, Gunpo (KR)

( * ) Notice: Subject to any disclaimer, the term of this patent is extended or adjusted under 35 U.S.C. 154(b) by 306 days.

(21) Appl. No.: 18/400,272

(22) Filed: Dec. 29, 2023

(65) Prior Publication Data

US 2024/0217345 A1 Jul. 4, 2024

(30) Foreign Application Priority Data

Dec. 29, 2022 (KR) ........................ 10-2022-0189368

(51) Int. Cl.
*B60L 7/18* (2006.01)
*G07C 5/00* (2006.01)

(52) U.S. Cl.
CPC ................ *B60L 7/18* (2013.01); *G07C 5/002* (2013.01); *B60L 2240/16* (2013.01); *B60L 2240/68* (2013.01); *B60L 2250/18* (2013.01)

(58) Field of Classification Search
None
See application file for complete search history.

(56) References Cited

U.S. PATENT DOCUMENTS

| | | | | |
|---|---|---|---|---|
| 2005/0080565 A1* | 4/2005 | Olney | B60W 50/16 | 340/903 |
| 2005/0234626 A1 | 10/2005 | Shiiba et al. | | |
| 2012/0203399 A1* | 8/2012 | Filev | B60W 50/14 | 701/1 |
| 2013/0204460 A1 | 8/2013 | Uno | | |

(Continued)

FOREIGN PATENT DOCUMENTS

JP 2015093560 A 5/2015

OTHER PUBLICATIONS

A. S. Yang and H. Peng, "Development of an Errorable Car-Following Driver Model," Vehicle System Dynamics, vol. 48, Issue 6, Oct. 2009, pp. 751-773. (Year: 2009).*

(Continued)

*Primary Examiner* — Navid Z. Mehdizadeh
*Assistant Examiner* — Jason R Roberson
(74) *Attorney, Agent, or Firm* — Fox Rothschild LLP

(57) ABSTRACT

A driving pattern regenerative braking method of a vehicle includes: collecting and inputting driving data, extracting deceleration data through preprocessing the driving data, clustering the deceleration data and removing outliers, calculating a deceleration rate change and an inter-vehicle distance to a vehicle in front from clustered data, deriving a quadratic equation of the deceleration rate change and the distance to the vehicle in front through polynomial regression, determining whether a predetermined condition is satisfied, and if so, modifying a regenerative braking system of the vehicle based on the quadratic equation, all of the (Continued)

above steps being performed by a controller. The method may further include calculating orthogonal distances and removing deceleration data furthest away in orthogonal distance from the quadratic equation if the predetermined condition is not satisfied.

20 Claims, 13 Drawing Sheets

(56) References Cited

U.S. PATENT DOCUMENTS

| | | | | |
|---|---|---|---|---|
| 2015/0203108 | A1* | 7/2015 | Loria | B60W 30/17 701/1 |
| 2023/0373487 | A1* | 11/2023 | Adiprasito | B60W 30/18072 |

OTHER PUBLICATIONS

Office action dated Jul. 17, 2025 for corresponding Korean patent application No. 10-2022-0189368.

* cited by examiner

○ DTW

: Dynamic Time Warping an algorithm for measuring similarity between two time sequences primarily used in applications such as speech recognition or pattern recognition (allowing for measuring similarity even when the lengths of the two sequences are different)

quadratic equation: $y=ax^2+bx+c$ $(0<x<120)$

| | a | b | c | $-\frac{b}{2a}$ | $-\frac{b^2-4ac}{4a}$ | $R^2$ |
|---|---|---|---|---|---|---|
| Soft | -0.00019 | 0.04032 | -2.89767 | 106.1 | -0.75859 | 0.901 |
| Medium | -0.00050 | 0.09045 | -4.83844 | 90.4 | -0.74784 | 0.830 |
| Strong | -0.00079 | 0.14191 | -7.99376 | 89.8 | -1.62083 | 0.785 |
| Driver's pattern | -0.00018 | 0.04247 | -3.04412 | 117.9722 | -0.53898 | 0.735 |

DRIVING PATTERN REGENERATIVE BRAKING METHOD OF VEHICLE

CROSS REFERENCE TO RELATED APPLICATION

The present application claims under 35 U.S.C. § 119(a) the benefit of Korean Patent Application No. 10-2022-0189368, filed Dec. 29, 2022, the entire contents of which are incorporated by reference herein.

BACKGROUND

(a) Technical Field

The present disclosure relates to a driving pattern regenerative braking method of a vehicle, more particularly, to a smart regenerative braking method configured to learn braking patterns of a driver and perform smart regenerative braking control similar to the braking patterns exhibited by the driver.

(b) Description of the Related Art

In general, a hybrid electric vehicle (HEV) refers to a vehicle that utilizes driving force provided by both an engine and an electric motor for power. Meanwhile, an electric vehicle (battery electric vehicle, abbreviated as BEV) refers to a vehicle that solely relies on the power of the electric motor and a battery for power.

In hybrid electric vehicles, the electric motor provides power for starting and low-speed driving, while the engine provides power during fuel-efficient cruising simultaneously operating a generator to supply power to the electric motor and recharge a battery.

In contrast, electric vehicles use electric motors to power the vehicle at all speeds.

When the driver does not press either the accelerator or brake pedal while driving, the vehicle enters an inertial drive (coasting drive) mode, during which regenerative braking is activated.

In general, regenerative braking refers to generation of regenerative braking torque, allowing the vehicle to decelerate, when the vehicle is coasting or when the brake pedal is engaged. where the power supplied to the motor is cut off, but reverse power is generated from the rotating wheels due to the vehicle's inertial force, and this reverse power is then reapplied to the motor, causing the generation of reverse torque in the motor.

Korean Patent Application No. 10-2020-0130514 pertains to a regenerative braking method for hybrid vehicles. As described therein, a controller of the regenerative braking system receives, during coasting with a detected vehicle in front, information generated by a forward vehicle recognition module and sensor signals generated by vehicle sensors, calculates a reference deceleration to maintain a safe distance with the forward vehicle, generates a drive torque command to output regenerative braking torque tracking the calculated reference deceleration, and transmits a command to the vehicle's drive system.

It is known to generate a reference deceleration to maintain a safe distance and defines three levels of smart regenerative braking intensity, such as strong, moderate, and gentle, to set the deceleration.

However, the vehicle's braking control relying on data pre-established during the vehicle development process may deviate from the user's actual driving habits, resulting in braking inconsistency.

SUMMARY

The present disclosure provides a driving pattern regenerative braking method configured to learn braking patterns typically exhibited by a driver and perform smart regenerative braking control similar to the braking patterns.

In order to accomplish the above objects, the driving pattern regenerative braking method of a vehicle may include: collecting and inputting, by a controller, driving data; extracting, by the controller, deceleration data through preprocessing the driving data; clustering, by the controller, the deceleration data and removing outliers; calculating, by the controller, a deceleration rate change and an inter-vehicle distance to the vehicle in front from clustered data; deriving, by the controller, a quadratic equation of the deceleration rate change and the distance to the vehicle in front through polynomial regression; determining whether the derived quadratic equation satisfies a predetermined condition, and modifying, by the controller, a regenerative braking system of the vehicle based on the quadratic equation being satisfied.

In addition, an embodiment of the present disclosure may include calculating orthogonal distances and removing deceleration data furthest away in orthogonal distance from the quadratic equation based on predetermined condition not being satisfied.

In an embodiment of the present disclosure may include determining a number of data sets is equal to or greater than a predetermined set after removing the deceleration data furthest away in orthogonal distance from the quadratic equation.

In an embodiment of the present disclosure, the extracting of deceleration data through preprocessing the driving data may include extracting the deceleration data into a plurality of sets.

In an embodiment of the present disclosure, the extracting of deceleration data through preprocessing the driving data may include calculating the deceleration rate change and the inter-vehicle distance to the vehicle in front during a deceleration state after extracting the deceleration data into a plurality of sets.

In an embodiment of the present disclosure, the extracting of deceleration data through preprocessing the driving data may include extracting the deceleration rate change and the inter-vehicle distance to the vehicle in front for the plurality of sets of deceleration data after calculating the deceleration rate change and the inter-vehicle distance to the vehicle in front during a deceleration state. In an embodiment of the present disclosure, the plurality of sets may be 42 sets.

In an embodiment of the present disclosure, the extracting of the deceleration rate change and the inter-vehicle distance to the vehicle in front for the plurality of sets of deceleration data may include extracting driver's braking characteristic data.

In an embodiment of the present disclosure, the extracting of the driver's braking characteristic data may include extracting the driver's braking characteristic data based on the inter-vehicle distance to the vehicle in front and the deceleration rate change.

In an embodiment of the present disclosure, the extracting of the deceleration rate change and the inter-vehicle distance to the vehicle in front for the plurality of sets of deceleration data may include filtering the extracted driver's braking characteristic data.

In an embodiment of the present disclosure, the filtering of the extracted driver's braking characteristic data may include excluding the driver's braking characteristic data where lateral acceleration increases excessively during vehicle turning.

In an embodiment of the present disclosure, the extracting of the deceleration rate change and the inter-vehicle distance to the vehicle in front for the plurality of sets of deceleration data may include classifying the filtered driver's braking characteristic data.

In an embodiment of the present disclosure, the classifying of the filtered driver's braking characteristic data may include classifying the data based on longitudinal acceleration increase or decrease resulting from changes in gradient.

In embodiment of the present disclosure, the clustering of the deceleration data and removing outliers may include applying a clustering algorithm combining a DBSCAN (density-based spatial clustering of applications with noise) method and a DTW (dynamic time warping) method.

In an embodiment of the present disclosure, the calculating of deceleration rate change and inter-vehicle distance to the vehicle in front from clustered data may include removing outlier deceleration data sets by clustering based on brake pedal stroke and relative speed with the vehicle in front as features during flat terrain driving, and classifying the deceleration data forming the cluster, with the exclusion of the outlier deceleration data sets, as driver's characteristic data.

In an embodiment of the present disclosure, the calculating of deceleration rate change and inter-vehicle distance to the vehicle in front from clustered data may include removing outlier deceleration data sets by clustering based on brake pedal stroke and relative speed with the vehicle in front as features during downhill driving, and classifying the deceleration data forming the cluster, with the exclusion of the outlier deceleration data sets, as driver's braking characteristic data.

In an embodiment of the present disclosure, the deriving of a quadratic equation of the deceleration rate change and the distance to the vehicle in front through polynomial regression may include performing the polynomial regression on clustered flat terrain and downhill deceleration data sets to derive the quadratic equations y a*x2+b×x+c [0<x<120/x: inter-vehicle distance/y: gradient deceleration].

In an embodiment of the present disclosure, the deriving of a quadratic equation of the deceleration rate change and the distance to the vehicle in front through polynomial regression may include evaluating whether the derived quadratic equation exhibits the characteristic of increasing the deceleration rate change as the inter-vehicle distance decreases, based on the condition A.

In an embodiment of the present disclosure, condition A may include:

$$y = ax2 + bx + c(0 < x < 120), \quad (1)$$

$$a < 0, \quad (2)$$

$$-b/2a > 50, \text{ and} \quad (3)$$

$$c < 0 \quad (4)$$

$$-(b2 - 4ac)/4a < 0. \quad (5)$$

In an embodiment of the present disclosure, the reflecting of the quadratic equation to a smart regenerative braking system for control may include applying the driver's braking characteristic data obtained through clustering to the smart regenerative braking system and implementing a braking start point and braking intensity to match the driver's braking pattern.

In an embodiment of the present disclosure, the removing of deceleration data furthest away in orthogonal distance from the quadratic equation may include re-collecting and re-inputting the driving data based on the number of deceleration data falling below a predetermined set after the removal of the deceleration data farthest away in orthogonal distance from the quadratic equation.

In an embodiment of the present disclosure, in the determining whether the number of data sets is equal to or greater than the number of a predetermined set, the number of the predetermined sets may be five or more.

A non-transitory computer readable medium containing program instructions executed by a processor includes: program instructions that collect and input driving data; program instructions that extract deceleration data through preprocessing the driving data; program instructions that cluster the deceleration data and remove outliers; program instructions that calculate a deceleration rate change and an inter-vehicle distance to a vehicle in front from clustered data; program instructions that derive a quadratic equation of the deceleration rate change and the distance to the vehicle in front through polynomial regression: program instructions that determine whether the derived quadratic equation satisfies a predetermined condition; and program instructions that modify a regenerative braking system of a vehicle being driven based on the quadratic equation being satisfied.

The technical solutions obtainable from the present disclosure are not limited to the aforesaid, and other solutions not described herein with can be clearly understood by those skilled in the art from the descriptions below.

BRIEF DESCRIPTION OF THE DRAWINGS

Various embodiments of the present disclosure are described with reference to the accompanying drawings, and similar reference numbers are used to collectively refer to similar components. In the following descriptions, presented for explanatory purposes, numerous specific details are provided to offer a comprehensive understanding of one or more embodiments. However, it will be evident that such embodiments can be implemented without these specific details.

DETAILED DESCRIPTION OF THE DISCLOSURE

Figure 1:
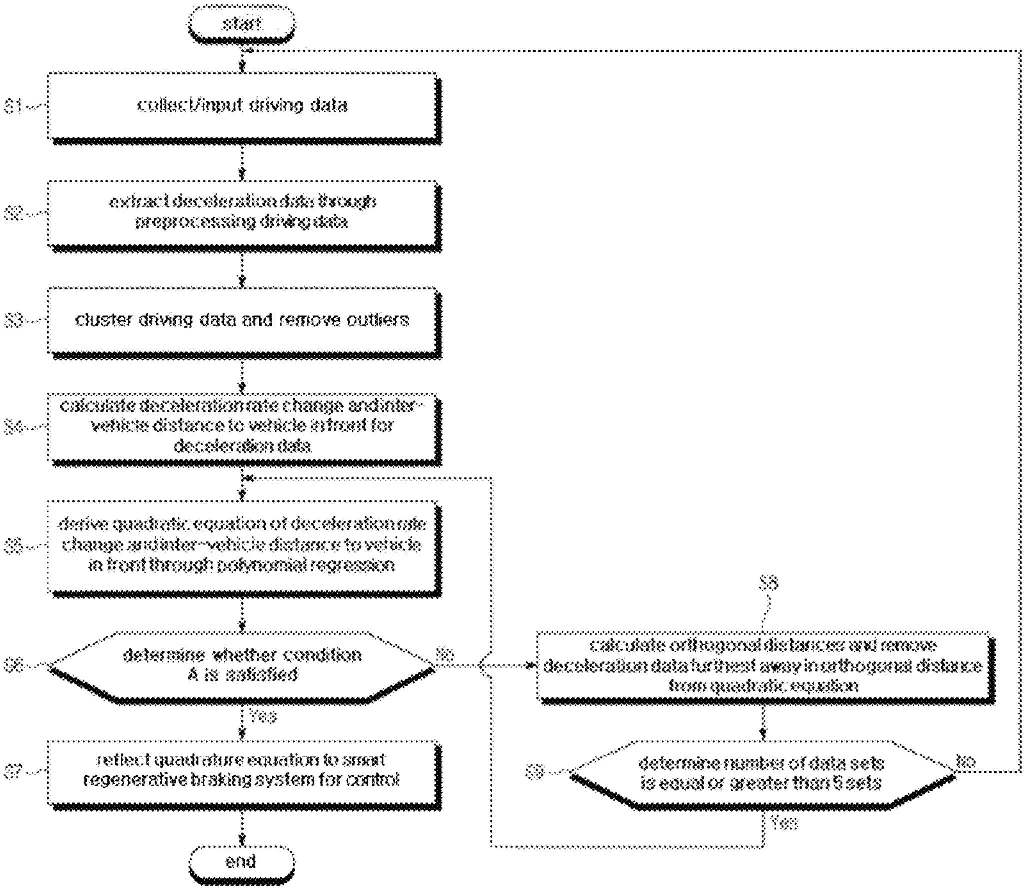
FIG. 1 is a flowchart illustrating a driving pattern regenerative braking method according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Advantages and features of the present disclosure and methods of accomplishing the same may be understood more readily by reference to the following detailed description of embodiments and the accompanying drawings. The present disclosure may, however, be embodied in many different forms and should not be construed as being limited to the exemplary embodiments set forth herein; rather, these exemplary embodiments are provided so that the present disclosure will be thorough and complete and will fully convey the concept of the disclosure to those skilled in the art, and the present disclosure will only be defined by the appended claims.

The shapes, sizes, ratios, angles, numbers and the like illustrated in the drawings to describe embodiments of the present disclosure are merely exemplary, and thus, the present disclosure is not limited thereto. Throughout the specification, the same reference numerals refer to the same components. In addition, detailed descriptions of well-known technologies may be omitted in the present disclosure to avoid obscuring the subject matter of the present disclosure. When terms such as "comprises." "has," "includes," or "is made up of" are used in this specification, it should be understood that unless "only" is specifically used, additional elements or steps can be included. Unless otherwise explicitly stated, when a component is expressed in the singular form, it is intended to encompass the plural form as well.

In interpreting the components, it is construed to include a margin of error even in the absence of explicit description.

When describing the positional relationship, for example, when the relationship between two parts is described as "on," "on top of." "underneath." "besides," etc., unless "directly" or "immediately" is used, one or more other parts may be located between the two parts.

Although the terms "first," "second," and the like are used to describe various components, these components are not limited by these terms. These terms are merely used for distinguishing one component from the other components. Therefore, the first component mentioned hereinafter may be the second component in the technical sense of the present disclosure.

Throughout the specification, the same reference numerals refer to the same components.

The sizes and thicknesses of each component shown in the drawings are presented for the convenience of description and are not intended to limit the present disclosure.

The features of various embodiments of the present disclosure can be combined or assembled, either partially or entirely, in various technical manners such as interlocking and interoperations obvious to those skilled in the art, and each embodiment can be independently implemented or in conjunction with related embodiments.

Hereinafter, detailed descriptions are made of the embodiments of the present disclosure with reference to the accompanying drawings. The embodiments described below may be applied redundantly as long as they do not conflict with each other.

With reference to FIG. 1, the driving pattern regenerative braking method of a vehicle according to an embodiment of the present disclosure includes collecting and inputting driving data at step S1, extracting deceleration data through preprocessing of driving data at step S2, clustering and removing outliers for the deceleration data at step S3, calculating the deceleration rate change and the distance to a vehicle in front from the clustered data at step S4, deriving a quadratic equation of the deceleration rate change and the inter-vehicle distance to the vehicle in front through polynomial regression at step S5, and determining whether a condition A (e.g., a predetermined condition) is satisfied at step S6.

Here, based on condition A being satisfied (YES) at step S6, the method proceeds to reflect the quadratic equation to a smart regenerative braking system for control at step S7. In other words, if the condition A (predetermined condition) is satisfied, then the regenerative braking system of the vehicle is modified based on the result of the quadratic equation.

On the contrary, based on condition A being not satisfied (NO) at step S6, the method proceeds to calculate the orthogonal distance from the quadratic equation to remove the deceleration data furthest away at step S8, and determine whether the number of data sets is equal to or greater than a predetermined set at step S9.

The above steps S1 through S9 as depicted in FIG. 1, for example may be performed by a controller. The controller may be provided with one or more modules and/or devices to perform the above steps. For example, the modules and/or devices may constitute hardware components that form part of a controller (e.g., modules or devices of a high-level controller), or may constitute individual controllers each having a processor and memory. A vehicle according to the disclosure may include one or more processors and memory.

Hereinafter, each step will be described in detail with reference to FIGS. 2A to 8.

Collecting and inputting driving data at step S1 may involve collecting actual driving data during the driver's driving and inputting the data into a database.

Figure 2A:
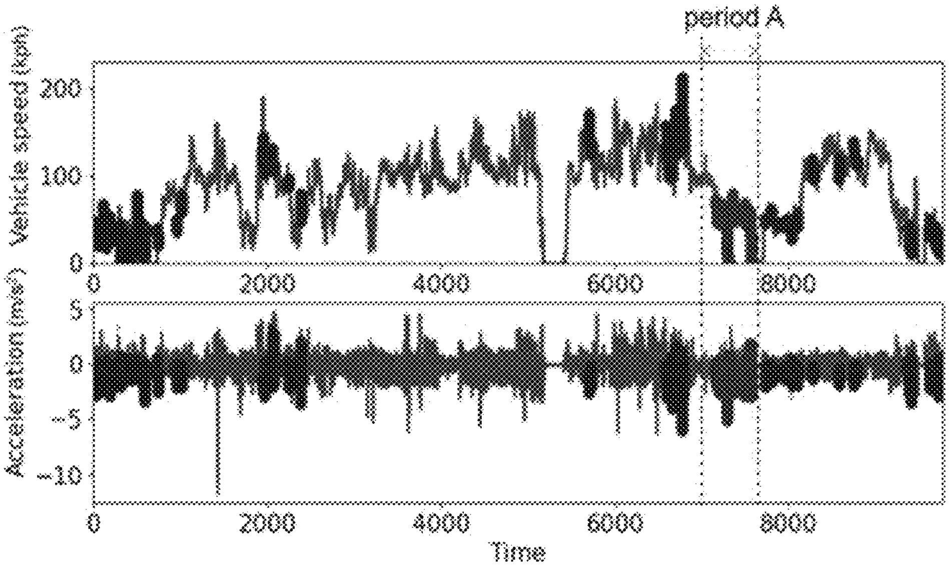
FIG. 2A shows graphs illustrating the step of extracting deceleration data into a plurality of sets from entire driving data during the process of extracting deceleration data through preprocessing of driving data according to an embodiment of the present disclosure.

Next, extracting deceleration data through preprocessing of driving data at step $2 may involve extracting deceleration data into a plurality of sets from the entire driving data, as shown in FIG. 2A. For example, multiple deceleration data are extracted during intervals such as period A where vehicle speed and acceleration decrease.

Here, the plurality of sets may be 42 sets. The deceleration data refers to deceleration data extracted when a vehicle in front is detected. That is, when the driver decelerates in a situation where a vehicle in front is detected, 42 sets of deceleration data are extracted.

Figure 2B:
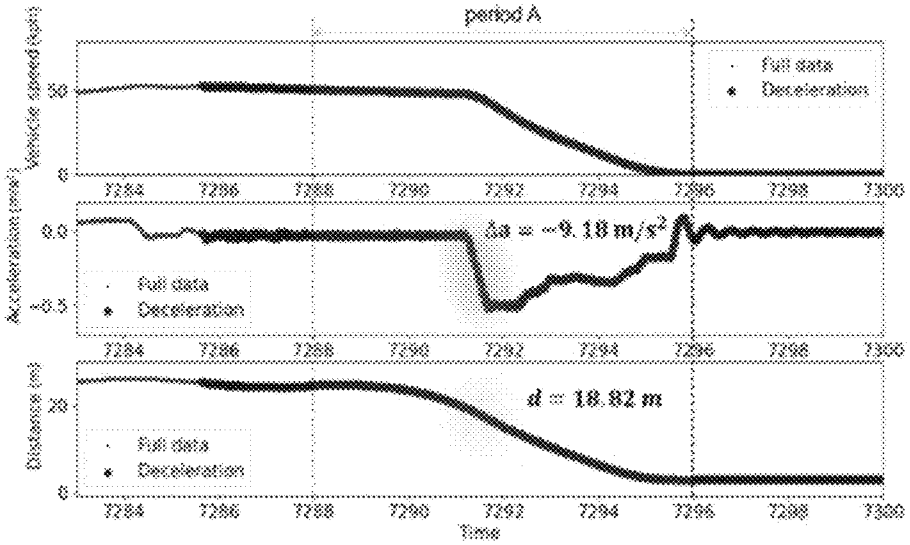
FIG. 2B shows graphs illustrating the step of calculating deceleration mate change and inter-vehicle distance to the vehicle in front during deceleration stage during the process of extracting deceleration data through preprocessing of driving data according to an embodiment of the present disclosure.

Next, the deceleration rate change and the inter-vehicle distance to the vehicle in front may be calculated during a deceleration stage, as shown in FIG. 2B. This involves selecting a specific period A and calculating the deceleration rate change and the inter-vehicle distance to the vehicle in front. For example, the deceleration rate change and the inter-vehicle distance to the vehicle in front are calculated using the decrease in vehicle speed and acceleration values during period A.

Figure 2C:
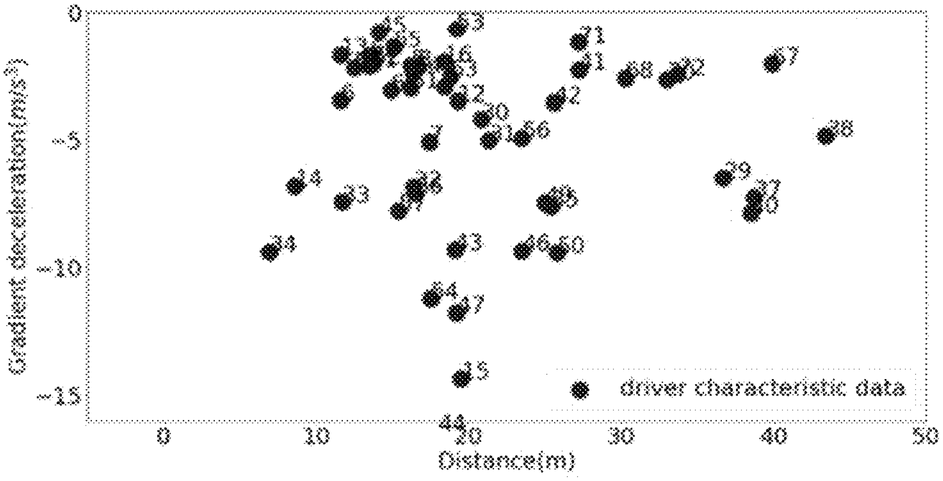
FIG. 2C shows a graph illustrating the step of extracting deceleration rate change and inter-vehicle distance to the vehicle in front for a plurality of deceleration data sets during the process of extracting deceleration data through preprocessing of driving data according to an embodiment of the present disclosure.

Next, the deceleration rate change and the inter-vehicle distance to the vehicle in front may be extracted for multiple sets of deceleration data, as shown in FIG. 2C. For example, the multiple sets of deceleration data are represented as points on the graph with the Y-axis representing deceleration rate change (gradient deceleration) and the X-axis representing the inter-vehicle distance to the vehicle in front (distance) in FIG. 2C. Here, each deceleration data may be assigned a unique number.

Figure 3A:
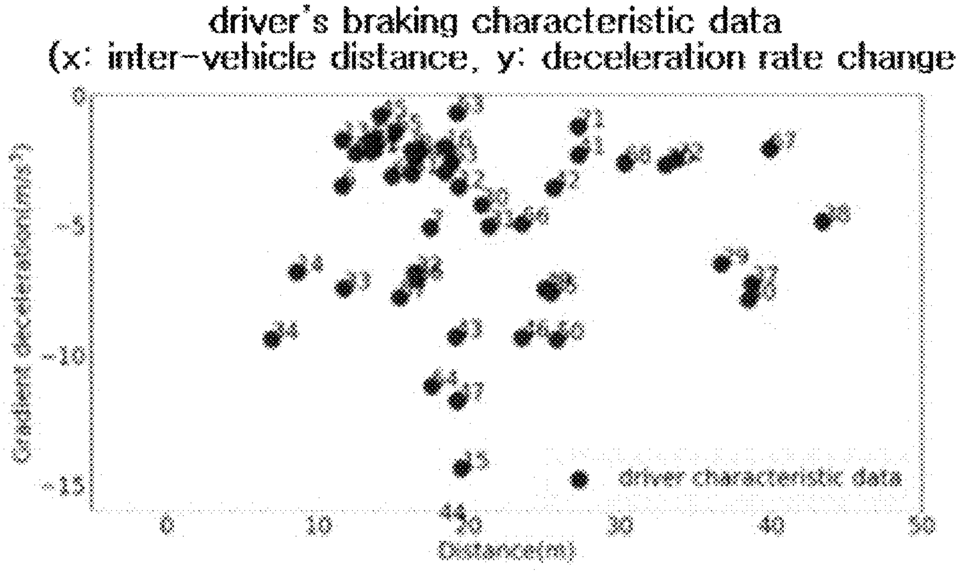
FIGS. 3A to 3F are graphs illustrating the steps of extracting driver's braking characteristic data, filtering the extracted driver's braking characteristic data, and classifying the filtered driver's braking characteristic data during the process of extracting deceleration data through preprocessing of driving data according to an embodiment of the present disclosure.

Next, driver's braking characteristic data may be extracted as shown in FIGS. 3A to 3F. This involves extracting driver's braking characteristic data based on the inter-vehicle distance to the vehicle in front and the deceleration rate change. The driver's braking characteristic data shown in FIG. 3A are equivalent to the deceleration data shown in FIG. 2C.

Subsequently, the extracted driver's braking characteristic data may be filtered. This involves excluding driver's braking characteristic data where lateral acceleration increases excessively during vehicle turning.

Figure 3B:
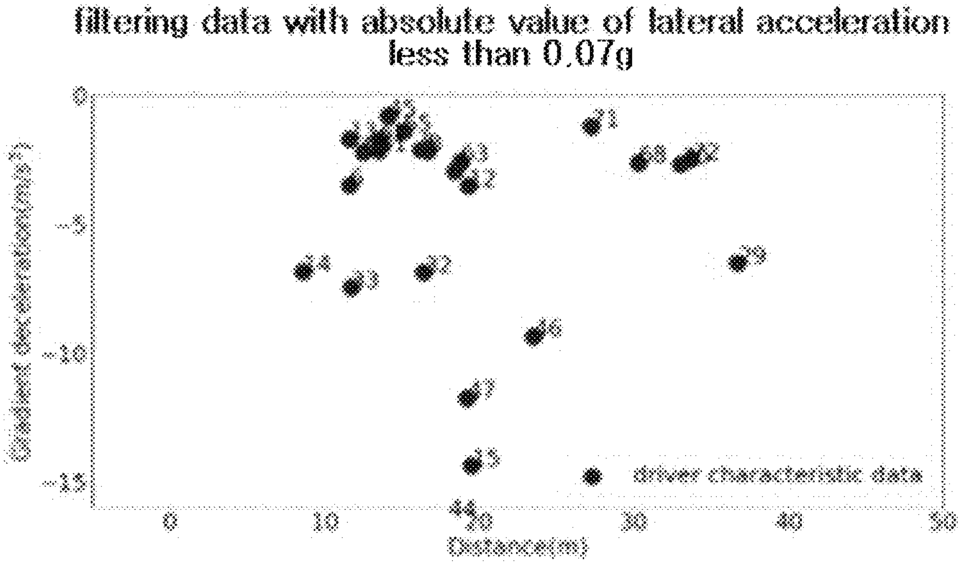
Figure 3C:
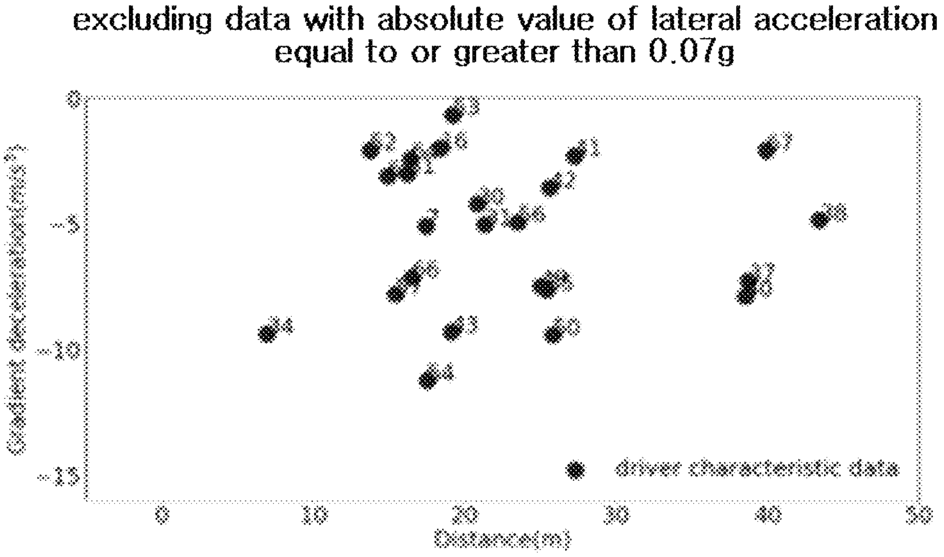

For example, it may be possible to filter data with an absolute value of lateral acceleration less than 0.07 g as shown in FIG. 3B and exclude data with an absolute value of lateral acceleration equal to or greater than 0.07 g as shown in FIG. 3C.

Subsequently, the filtered driver's braking characteristic data may be classified. This involves classifying the data based on changes in the longitudinal acceleration due to the gradient.

Figure 3D:
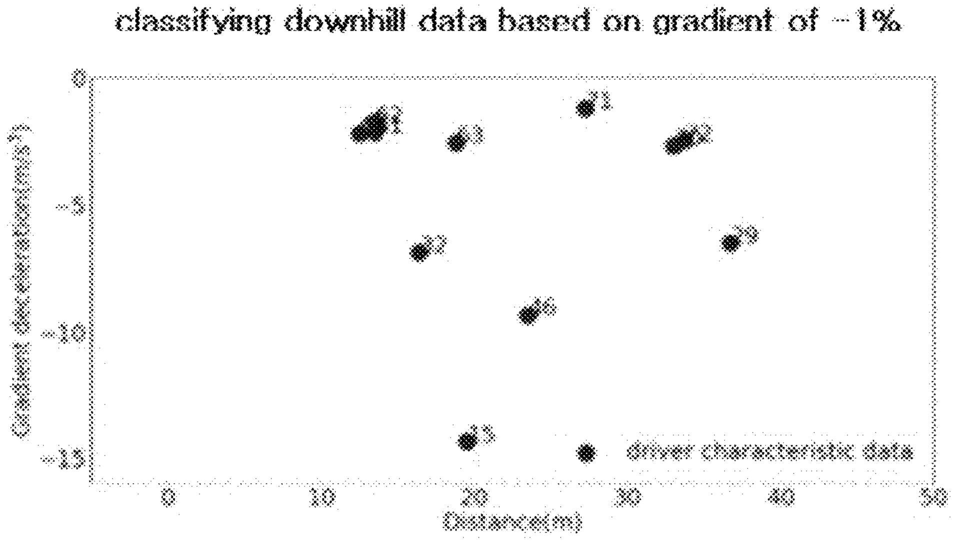

For example, downhill data may be classified based on a gradient of −1%, as shown in FIG. 3D.

Figure 3E:
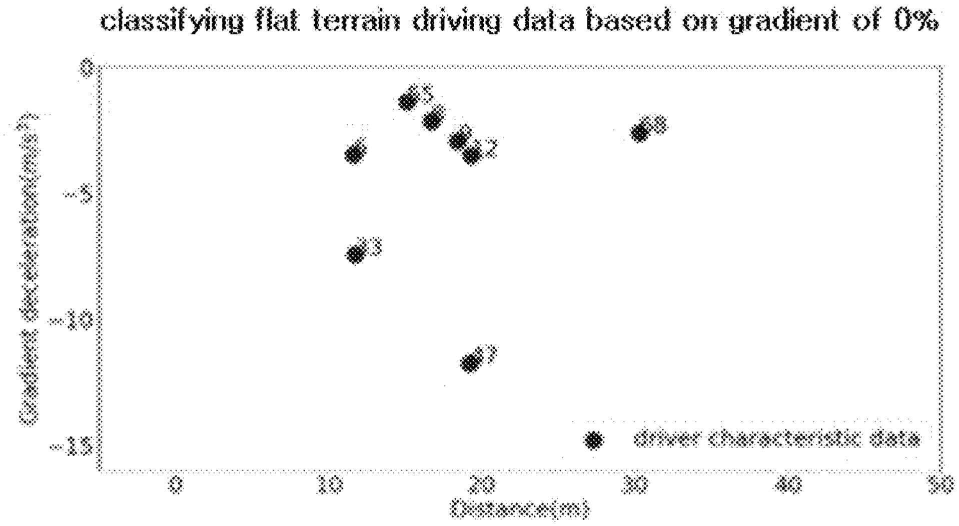

Alternatively, flat terrain driving data may be classified based on a gradient of 0%, as shown in FIG. 3E.

Figure 3F:
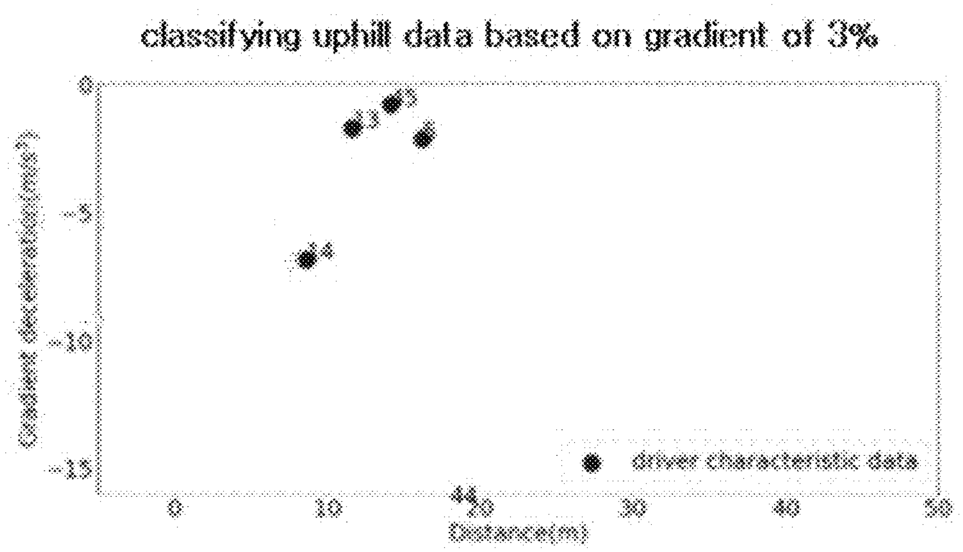

Alternatively, uphill data may be classified based on a gradient of 3% as shown in FIG. 3F.

However, these are just examples, and the gradient criteria for classifying downhill, flat terrain, and uphill may vary.

Next, clustering and removing outliers for the deceleration data at step S3 may be performed by applying a clustering algorithm combining the DBSCAN method and DTW method.

Figure 4A:
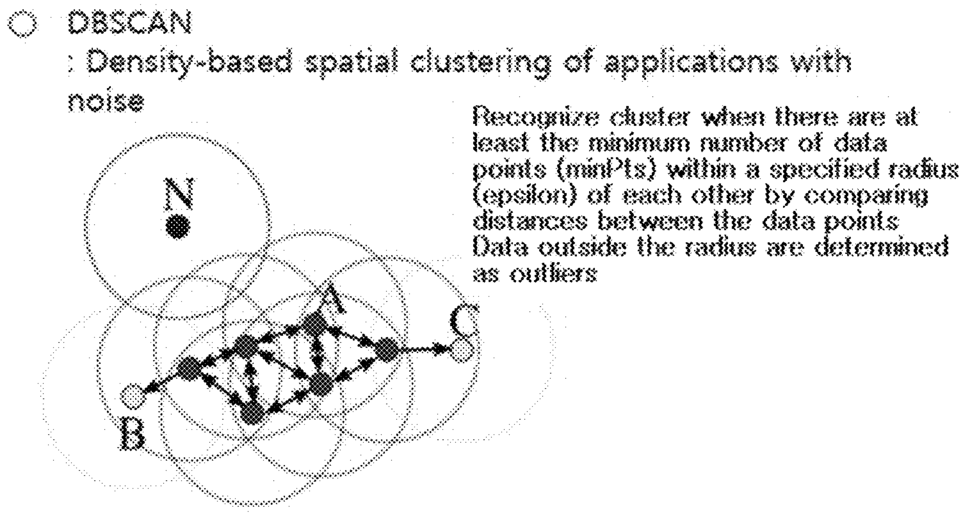
FIG. 4A is a diagram illustrating a method of DBSCAN (density-based spatial clustering of applications with noise) as a clustering algorithm during the process of clustering and removing outliers for deceleration data according to an embodiment of the present disclosure.

FIG. 4A illustrates the DBSCAN method for the clustering algorithm.

The DBSCAN method recognizes a cluster when there are at least the minimum number of data points (minPts) within a specified radius (epsilon) of each other by comparing distances between the data points. Data points outside the radius are determined as outliers.

Figure 4B:
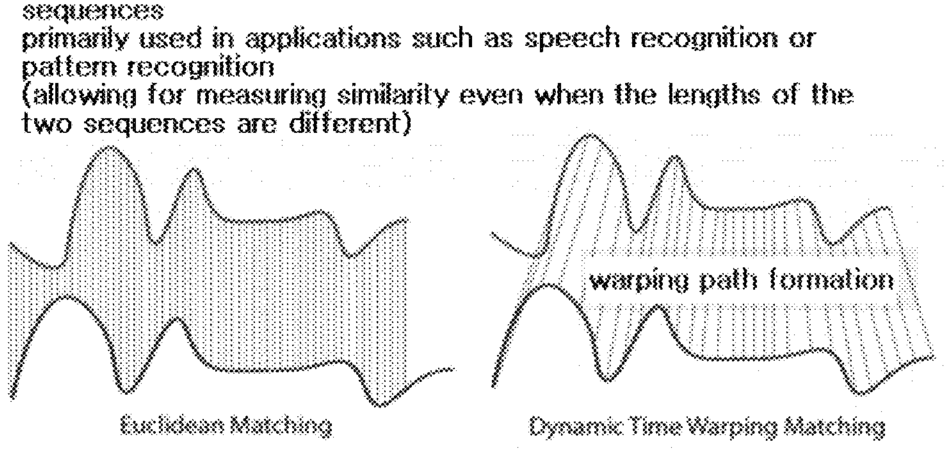
FIG. 4B is a diagram illustrating a method of DTW (Dynamic Time Warping) as a clustering algorithm during the process of clustering and removing outliers for deceleration data according to an embodiment of the present disclosure.

FIG. 4B illustrates the DTW (Dynamic Time Warping) method for the clustering algorithm.

The DTW method is an algorithm for measuring the similarity between two time sequences, primarily used in applications such as speech recognition or pattern recognition. This allows for measuring similarity even when the lengths of the two sequences are different.

Next, calculating the deceleration rate change and the inter-vehicle distance to the vehicle in front for the clustered data at step $4 is performed.

In this step, driver's flat terrain braking characteristic data may be initially extracted.

This step involves removing outlier deceleration data sets by clustering based on brake pedal stroke and relative speed with the vehicle in front as features during flat terrain driving, and classifying the deceleration data forming the cluster, with the exclusion of the outlier deceleration data sets, as driver's braking characteristic data.

Figure 5:
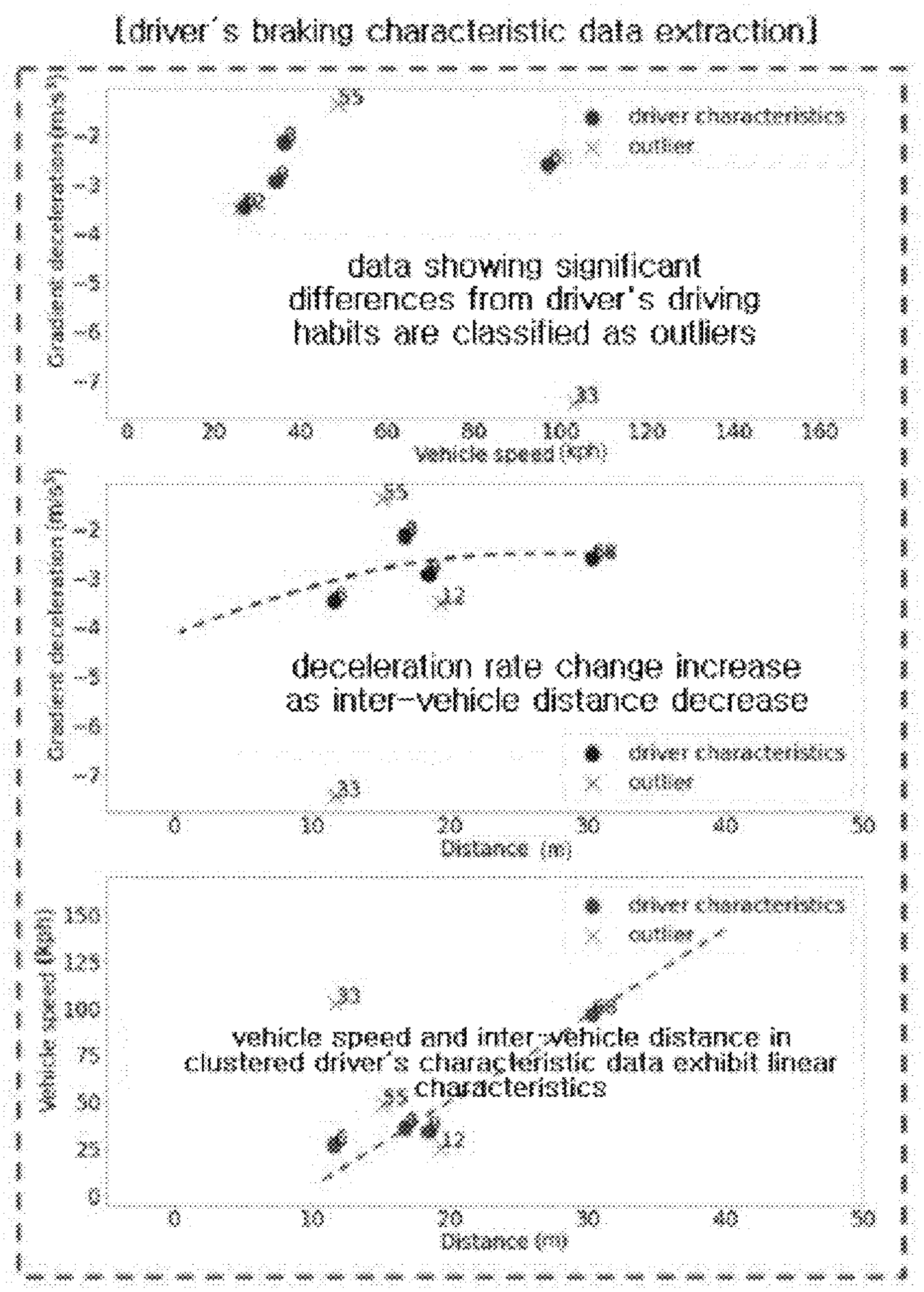
FIG. 5 shows graphs illustrating the step of clustering flat terrain driving data during the process of calculating deceleration rate change and inter-vehicle distance to the vehicle in front from clustered data according to an embodiment of the present disclosure.

For example, with reference to the graph of deceleration (gradient deceleration) over vehicle speed at the top of FIG. 5, driver's flat terrain braking characteristic data is extracted, and data showing significant differences from the driver's driving habits (driving characteristics) are classified as outliers.

With reference to the graph of deceleration over the inter-vehicle distance to the vehicle in front presented in the middle of the drawing, as the inter-vehicle distance to the vehicle in front decreases, the deceleration rate change tends to increase. This phenomenon is attributed to the driver's tendency to increase the stroke of the brake pedal on flat terrain as the inter-vehicle distance to the vehicle in front decreases.

With reference to the graph of vehicle speed over the inter-vehicle distance to the vehicle in front presented at the bottom, it can be observed that the vehicle speed and the inter-vehicle distance to the vehicle in front in driver's braking characteristic data do not exhibit linear characteristics. It can be observed that the deceleration data is scattered in various places around the dotted straight line.

In this way, the driver's flat terrain braking characteristic data for deceleration is extracted during flat terrain driving as described above.

Figure 6:
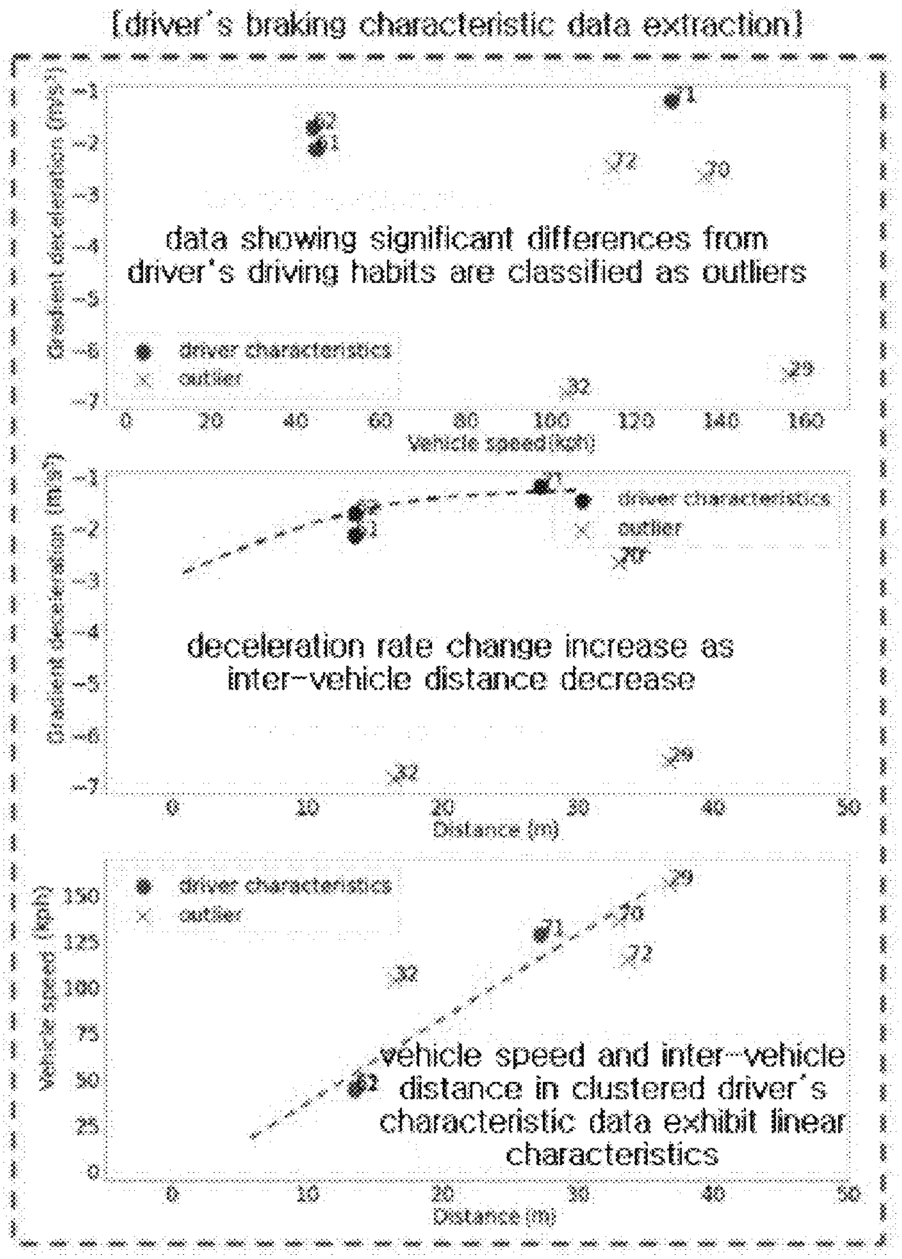
FIG. 6 shows graphs illustrating the step of clustering downhill driving data during the process of calculating deceleration rate change and inter-vehicle distance to the vehicle in front from clustered data according to an embodiment of the present disclosure.

Next, driver's downhill braking characteristic data is extracted, as shown in FIG. 6.

This step involves removing outlier deceleration data sets through clustering based on brake pedal stroke and relative speed with the vehicle in front as features during downhill driving, and classifying the deceleration data forming the cluster with the exclusion of the outlier deceleration data sets as driver's braking characteristic data.

For example, with reference to the graph of deceleration (gradient deceleration) over vehicle speed at the top of FIG. 6, driver's downhill braking characteristic data is extracted, and data showing significant differences from the driver's driving habits (driving characteristics) are classified as outliers.

With reference to the graph of deceleration over the distance to the vehicle in front presented in the middle of the drawing, as the distance to the vehicle in front decreases, the deceleration rate change tends to increase. This phenomenon is attributed to the driver's tendency to increase the stroke of the brake pedal on downhill as the inter-vehicle distance to the vehicle in front decreases.

With reference to the graph of vehicle speed over the inter-vehicle distance to the vehicle in front presented at the bottom, it can be observed that the vehicle speed and the inter-vehicle distance to the vehicle in front in driver's braking characteristic data exhibit linear characteristics. It can be observed that the deceleration data is marked adjacent to the dotted straight line.

In this way, the driver's downhill braking characteristic data for deceleration is extracted.

Figures 7A, 7B:
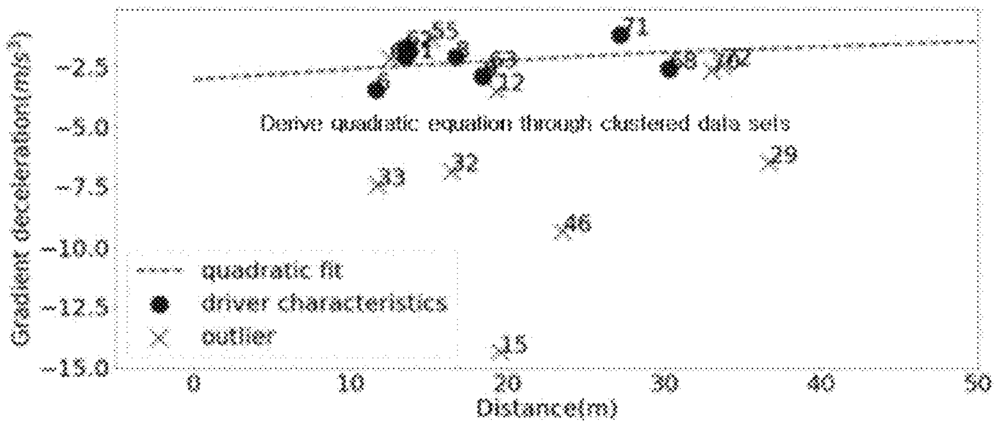
FIGS. 7A to 7C show a table and graphs illustrating the step of deriving a quadratic equation for deceleration rate change and inter-vehicle distance to the vehicle in front through polynomial regression according to an embodiment of the present disclosure.
Figure 7C:
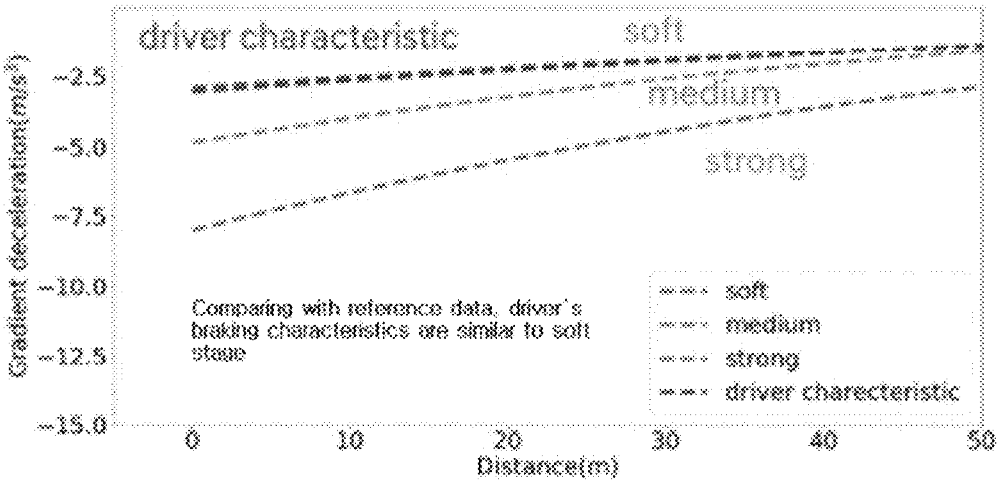

Deriving a quadratic equation for the deceleration rate change and the distance to the vehicle in front through polynomial regression at step S5 may involves performing polynomial regression on the clustered flat terrain and downhill deceleration data sets, as shown in FIGS. 7A to 7C.

Here, the quadratic equation may be derived on condition A.

[Condition A]

$$y = ax^2 + bx + c(0 < x < 120) \quad (1)$$

$$a < 0 \quad (2)$$

$$-b/2a > 50 \quad (3)$$

$$c < 0 \quad (4)$$

$$-(b^2 - 4ac)/4a < 0 \quad (5)$$

Determining whether condition A is satisfied at step S6 involves verifying whether condition A is satisfied.

Whether condition A is satisfied is determined as shown in FIGS. 7A to 7C.

Among the soft, medium, and strong driving conditions, the soft stage is the most similar to the driver's pattern.

As a result, the quadratic equation y=0.00018×x$^2$+0.04247×x−3.04412 [0<X<120/x: inter-vehicle distance/y: gradient deceleration] can be derived.

A specific condition may be used to evaluate whether the derived quadratic equation has the characteristic of increasing the deceleration rate as the inter-vehicle distance decreases.

Based on condition A being satisfied (YES) at step S6, the method proceeds to perform control by reflecting the quadratic equation into the smart regenerative braking system for control at step $7.

For example, this step involves applying driver's braking characteristic data obtained through clustering to the smart regenerative braking system and implementing the braking (deceleration) starting point and braking (deceleration) intensity (rate) to match the driver's braking pattern.

That is, by extracting and classifying the driver's braking characteristics as data, the system automatically determines and executes the braking starting point and intensity according to the driver's driving habits, considering conditions such as flat terrain, downhill driving, and the inter-vehicle distance to the vehicle in front.

For example, the driver's braking starting point and braking intensity extracted based on the values shown in FIG. 7A may be determined as follows.

$$\text{braking (deceleration) starting point}(m) \quad (a)$$

$$y = 4.6473x - 28.2627(0 < x < 120)$$

Here, x represents the distance, and y represents the gradient deceleration.

Figure 8A:
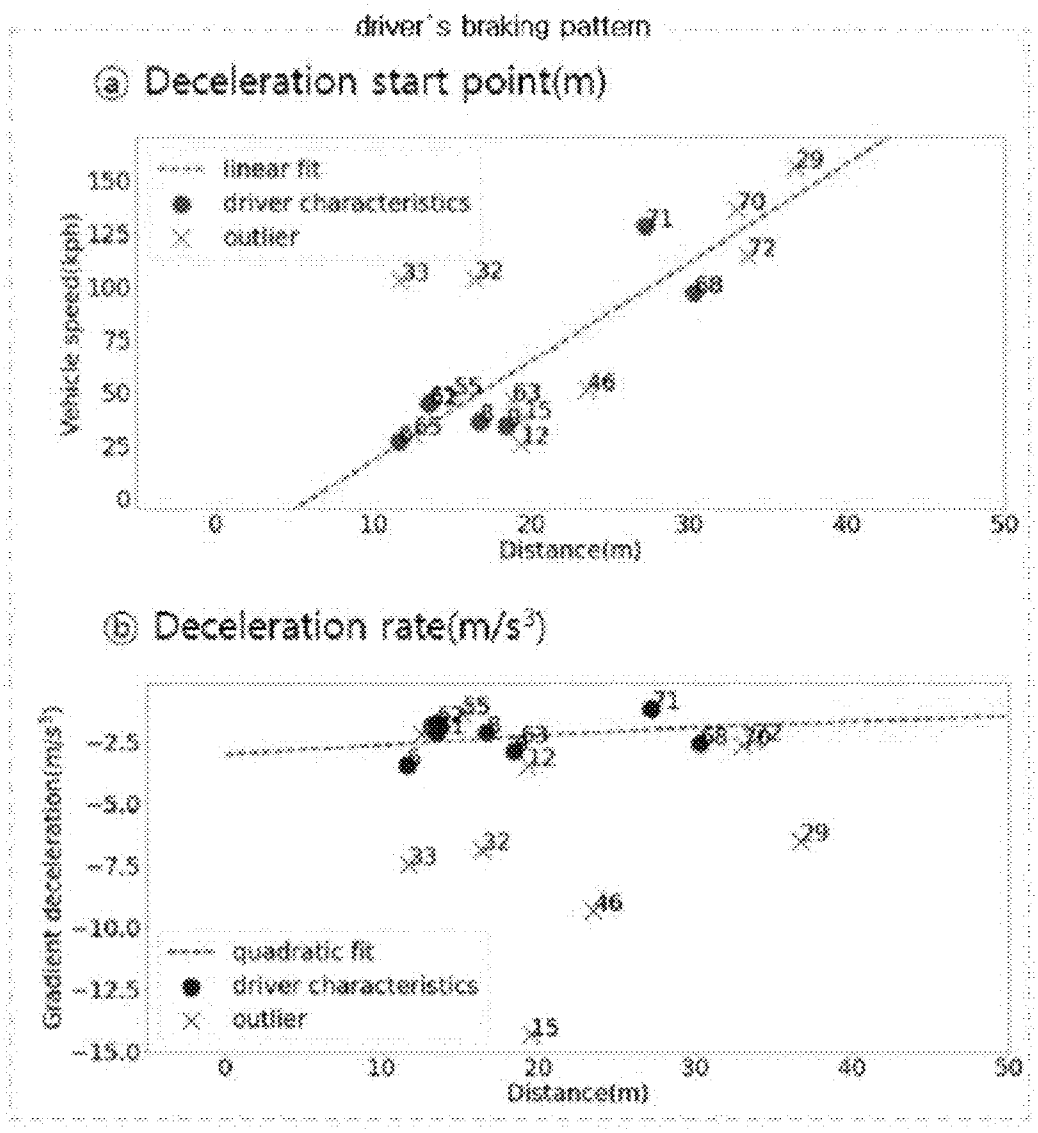
FIGS. 8A and 8B show graphs illustrating the step of controlling by incorporating a quadratic equation to a smart regenerative braking system according to an embodiment of the present disclosure.

For example, with reference to the graph at the top of FIG. 8A, the dotted line (linear fit) forms a linear shape, representing a first-degree equation, and the deceleration data that meets the driver's braking characteristics is formed adjacent to the dotted line.

$$\text{braking (deceleration) intensity (rate)} \left(\text{m/s}^2\right) \quad (b)$$

$$y = 0.00018x^2 + 0.04247x - 3.04412\ (0 < x < 120)$$

The numbers are the values of a, b, and c for the driver's pattern presented in FIG. 7A.

For example, with reference to the graph at the bottom of FIG. 8A, the dotted line (quadratic fit) forms a curved shape representing a quadratic equation, and the deceleration data that meets the driver's braking characteristics is formed adjacent to the dotted line.

Figure 8B:
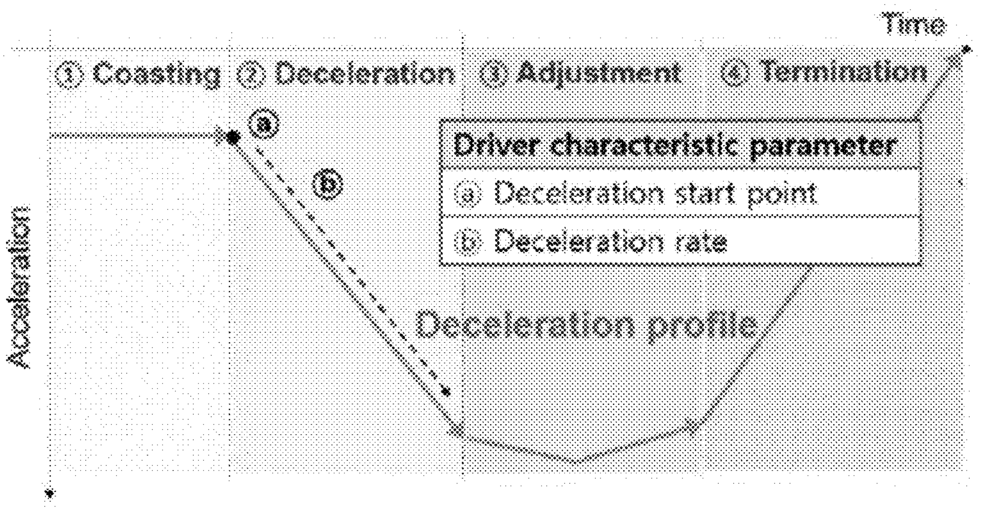

For example, with reference to FIG. 8B, during the transition from the initial coasting driving segment to the deceleration driving segment, @ the braking starting point and b) the braking intensity, as indicated in FIG. 8A, are applied to align with the driver's braking characteristics for decelerating the vehicle's speed. Subsequently, the vehicle speed adjustment section and the vehicle speed adjustment termination section follow in series.

In this way, the smart regenerative braking is executed by automatically applying the braking starting point and braking intensity in the deceleration segment, reflecting the driver's usual braking characteristics.

On the contrary, based on condition A being not satisfied (NO) at step S6, the method proceeds to calculate the orthogonal distance from the quadratic equation to remove the deceleration data furthest away at step S8, and determine whether the number of data sets is equal to or greater than a predetermined set at step S9.

After removing the deceleration data farthest away in orthogonal distance from the quadratic equation, when the number of deceleration data falls below a predetermined set, the procedure goes back to step S1, which involves collecting and inputting the driving data.

Here, the predetermined set for use in the determination may be five or more. That is based on the number of deceleration data to be removed being less than 5, the procedure goes back to step S1, and then steps S2 to S6 are performed again to extract the driver's braking characteristic data.

The present disclosure is advantageous in terms of achieving smart regenerative braking control similar to the driver's driving habits by learning the braking patterns preferred by the driver.

That is, it is possible to perform smart regenerative braking control similar to the user's driving habits by learning the braking patterns preferred by the user based on vehicle control unit (VCU) data. This addresses the issue of braking inconsistency that may arise when using the smart regenerative braking function.

Furthermore, through the analysis of driving data and the management of personalized driving pattern data in the cloud, individuals can download their personalized data for a driving experience similar to that of a privately owned vehicle even in shared vehicles. This can enhance the driver's driving satisfaction.

The advantageous effects of the present disclosure are not limited to the aforesaid, and other effects not described herein with can be clearly understood by those skilled in the art from the descriptions below.

The foregoing descriptions are merely exemplary embodiments of the driving pattern regenerative braking method.

Therefore, it should be noted that those skilled in the art can readily understand that the present disclosure can be substituted or modified in various forms within the scope of the claims below, without departing from the spirit of the disclosure.

What is claimed is:

1. A driving pattern regenerative braking method of a vehicle, the method comprising:
- collecting and inputting, by a controller, driving data;
- extracting, by the controller, deceleration data through preprocessing the driving data;
- processing, by the controller, the deceleration data by clustering the deceleration data and removing outliers;
- calculating, by the controller, a deceleration rate change and an inter-vehicle distance to a vehicle in front from clustered data;
- deriving, by the controller, a quadratic equation of the deceleration rate change and the distance to the vehicle in front through polynomial regression;
- determining, by the controller, whether the derived quadratic equation satisfies a predetermined condition;
- relating, by the controller, the derived quadratic equation to match a driver's braking pattern; and
- modifying, by the controller, a regenerative braking system of the vehicle based on the quadratic equation being satisfied by implementing a braking start point and braking intensity to match the driver's braking pattern.

2. The method of claim 1, further comprising:
- calculating orthogonal distances and removing deceleration data furthest away in orthogonal distance from the quadratic equation based on the predetermined condition not being satisfied.

3. The method of claim 2, further comprising determining whether a number of data sets is equal to or greater than a predetermined number after removing the deceleration data furthest away in orthogonal distance from the quadratic equation.

4. The method of claim 3, wherein the extracting of deceleration data through preprocessing the driving data comprises:
- extracting the deceleration data into a plurality of sets;
- calculating the deceleration rate change and the inter-vehicle distance to the vehicle in font during a deceleration state; and
- extracting the deceleration rate change and the inter-vehicle distance to the vehicle in front for the plurality of sets of deceleration data.

5. The method of claim 4, wherein the plurality of sets is 42 sets.

6. The method of claim 4, wherein the extracting of the deceleration rate change and the inter-vehicle distance to the vehicle in front for the plurality of sets of deceleration data comprises extracting driver's braking characteristic data.

7. The method of claim 6, wherein the extracting of the driver's braking characteristic data comprises extracting the driver's braking characteristic data based on the inter-vehicle distance to the vehicle in front and the deceleration rate change.

8. The method of claim 7, wherein the extracting of the deceleration rate change and the inter-vehicle distance to the vehicle in front for the plurality of sets of deceleration data comprises filtering the extracted driver's braking characteristic data after extracting the driver's braking characteristic data.

9. The method of claim 8, wherein the filtering of the extracted driver's braking characteristic data comprises excluding the driver's braking characteristic data where lateral acceleration increases beyond a predetermined value during vehicle turning.

10. The method of claim 9, wherein the extracting of the deceleration rate change and the inter-vehicle distance to the vehicle in front for the plurality of sets of deceleration data comprises classifying the filtered driver's braking characteristic data after filtering the extracted driver's braking characteristic data.

11. The method of claim 10, wherein the classifying of the filtered driver's braking characteristic data comprises classifying the data based on longitudinal acceleration increase or decrease resulting from changes in gradient.

12. The method of claim 11, wherein the clustering of the deceleration data and removing outliers comprises applying a clustering algorithm combining a DBSCAN (density-based spatial clustering of applications with noise) method and a DTW (dynamic time warping) method.

13. The method of claim 12, wherein the calculating of deceleration rate change and inter-vehicle distance to the vehicle in front from clustered data comprises:

removing outlier deceleration data sets by clustering based on brake pedal stroke and relative speed with the vehicle in front as features during flat terrain driving; and classifying the deceleration data forming the cluster, with the exclusion of the outlier deceleration data sets, as driver's braking characteristic data.

14. The method of claim 13, wherein the calculating of deceleration rate change and inter-vehicle distance to the vehicle in front from clustered data comprises:

removing outlier deceleration data sets by clustering based on brake pedal stroke and relative speed with the vehicle in front as features during downhill driving; and classifying the deceleration data forming the cluster, with the exclusion of the outlier deceleration data sets, as driver's braking characteristic data.

15. The method of claim 14, wherein the deriving of a quadratic equation of the deceleration rate change and the distance to the vehicle in front through polynomial regression comprises performing the polynomial regression on clustered flat terrain and downhill deceleration data sets to drive the quadratic equation:

$$y = a \times x^2 + b \times x + c[0 < X < 120/x\text{: inter-vehicle distance}/y\text{: gradient deceleration}].$$

16. The method of claim 15, wherein the deriving of a quadratic equation of the deceleration rate change and the distance to the vehicle in front through polynomial regression comprises evaluating whether the derived quadratic equation exhibits the characteristic of increasing the deceleration rate change as the inter-vehicle distance decreases, based on the predetermined condition.

17. The method of claim 16, wherein the predetermined condition comprises:

$$y = ax^2 + bx + c(0 < x < 120), \quad (1)$$

$$a < 0, \quad (2)$$

$$-b/2a > 50, \text{ and} \quad (3)$$

$$c < 0 \quad (4)$$

$$-(b^2 - 4ac)/4a < 0. \quad (5)$$

18. The method of claim 17, further comprising:

applying the driver's braking characteristic data obtained through clustering to the regenerative braking system.

19. The method of claim 18, wherein the removing of deceleration data furthest away in orthogonal distance from the quadratic equation comprises re-collecting and re-inputting the driving data based on the number of deceleration data falling below a predetermined set after the removal of the deceleration data farthest away in orthogonal distance from the quadratic equation.

20. A non-transitory computer readable medium containing program instructions executed by a processor, the computer readable medium comprising:

program instructions that collect and input driving data;

program instructions that extract deceleration data through preprocessing the driving data;

program instructions that process the deceleration data by clustering the deceleration data and removing outliers;

program instructions that calculate a deceleration rate change and an inter-vehicle distance to a vehicle in front from clustered data;

program instructions that derive a quadratic equation of the deceleration rate change and the distance to the vehicle in front through polynomial regression;

program instructions that determine whether the derived quadratic equation satisfies a predetermined condition;

program instructions that relate the derived quadratic equation to match a driver's braking pattern; and program instructions that modify a regenerative braking system of a vehicle being driven based on the quadratic equation being satisfied by implementing a braking start point and braking intensity to match the driver's braking pattern.

* * * * *